United States Patent Office 3,012,721
Patented Dec. 12, 1961

3,012,721
DIGITAL RANGE UNIT
Paul E. Fiske, 1059 Devonshire Drive, San Diego 7, Calif.
Filed July 24, 1959, Ser. No. 829,468
3 Claims. (Cl. 235—92)
(Granted under Title 35, U.S. Code (1952), sec. 266)

The invention described herein may be manufactured and used by or for the Government of the United States of America for governmental purposes without the payment of any royalties thereon or therefor.

This invention relates to a digital range unit and more particularly to a digital range unit which is crystal controlled and with an automatic digital recount.

Since one severe disadvantage of the prior art range units lies in the necessity for constant and diligent manual operation requiring a high degree of skill in reducing range error due to the human element, the need has long existed for an automatic and preferable digital readout in the automatic tracking type of radar range unit. Other serious disadvantages of the prior art range units have been the need for frequent calibration and adjustment and the relative complexity of such units, which require maintenance personnel with a high degree of skill and training.

According to the invention, a free running crystal oscillator is passed through a gated coincidence circuit to a set of digital counters. The oscillator frequency, which is preferably crystal controlled, can be set at any particular range increment of interest. The coincidence circuit is gated by a gate generator which is started by the associated transmitter pulse and stopped by the video or target pulse of interest. To avoid spurious echoes or targets from stopping the gate generator and thus the range counter, the video is also gated so that only targets falling within a predetermined range area are seen by the gate generator. The transmitter pulse is also passed through a variable delay circuit, which is both manually driven and motor driven, through a delay line the output of which drives a servo drive unit. The video is also coupled to the servo drive unit which yields an output of a polarity or phase dependent upon the time relation between the video pulse and the total delay time introduced by the variable delay unit and the delay line. In the case where the variable delay time is insufficient, the output drives the delay motor to increase the delay, and in the reverse instance, the output drives the delay motor to decrease the delay. The inputs and outputs of the fixed delay line drive the video gate which, again, determines the range of video capable of stopping the oscillator gate. Thus, as long as the video pulse of interest falls within the delaying range of the delay line it will serve to stop the free running oscillator gate and stop the counter automatically. The only function of the servo system is to position the time the transmitter pulse enters and leaves the fixed delay line so as to precisely surround the video signal of interest. This will insure an exact count on the counter circuit. The total delay output of the delay line is also utilized to actuate the read gate circuit and is further delayed and utilized as a counter reset pulse. Thus, the entire system is automatic and requires only that the operator place the variable delay initially so that the video pulse of interest lies in the fixed delay line time. The system requires no calibration since the only precision component is the free running oscillator which again can be crystal controlled. If the video pulse of interest is too weak to trigger the gate circuit, a range mark can be utilized for this purpose by manually adjusting the range mark to coincide with the video pulse on the cathode ray presentation, and switching the gating circuit to receive the range mark which will stop the gate pulse at the same time as the video, closing the oscillator gate and stopping the count. Since a minimum of precision components are utilized, and, indeed, a minimum of components, maintenance can be effected much easier and with less training and skill required of the maintenance personnel.

It is thus an object of the present invention to provide a digital range unit which requires a minimum of calibration and maintenance.

Another object is the provision of a digital range unit with an automatic operation and readout.

A further object is to provide a digital range unit with a minimum of precision components.

Still another object of the invention is the provision of a digital range unit that can be utilized with any existing radar equipment.

Other objects and many of the attendant advantages of this invention will be readily appreciated as the same becomes better understood by reference to the following detailed description when considered in connection with accompanying drawings where like reference numerals designate like parts throughout the figures thereof and wherein.

Figure 1:
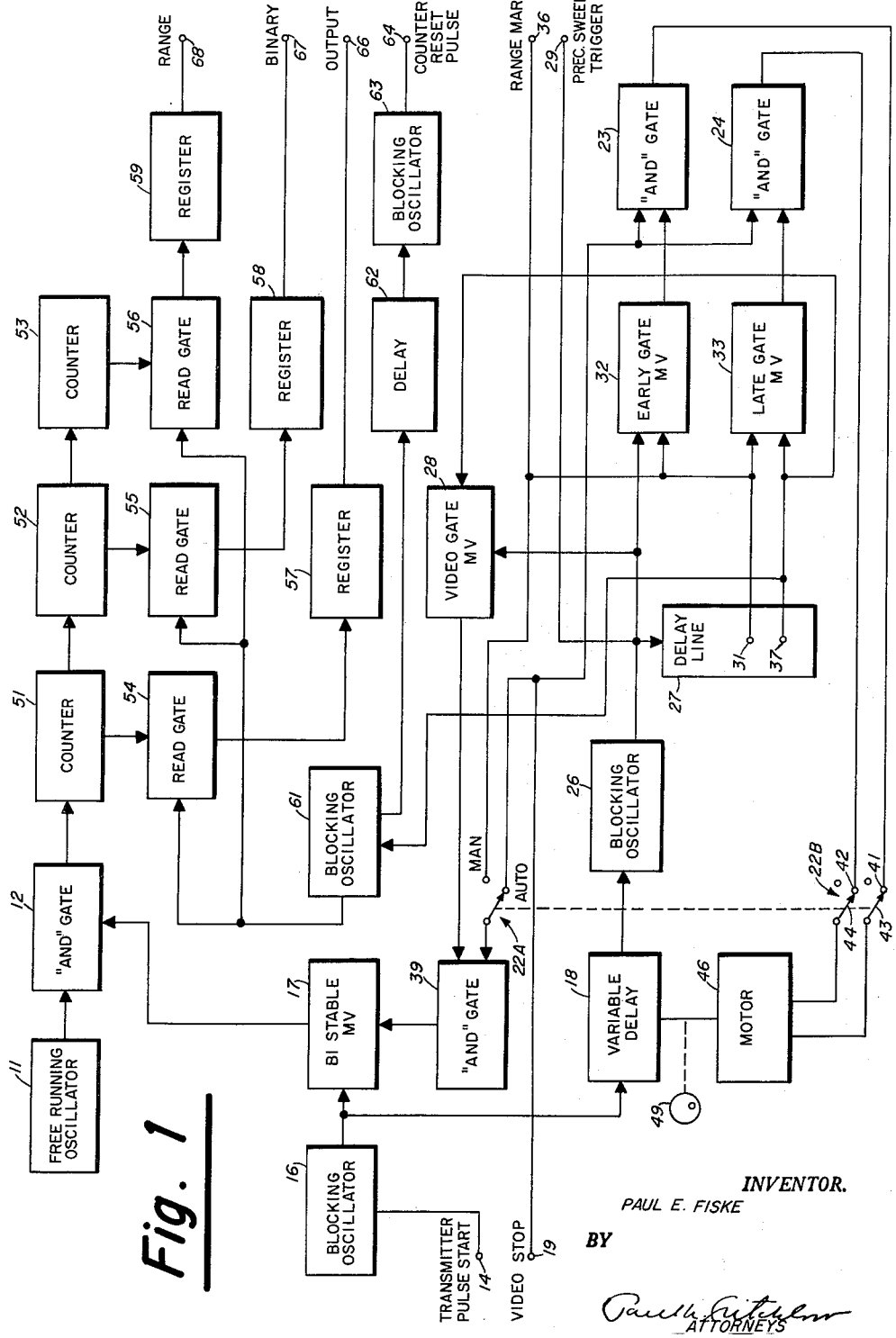
FIG. 1 shows a block diagram of a preferred embodiment of the invention.

Referring now to FIG. 1, free running oscillator 11 is coupled through gate 12 to counter circuitry generally indicated at 51–53. Input terminal 14 is coupled to blocking oscillator 16 which in turn is coupled to bistable multivibrator 17 and variable delay 18. Input terminal 19 is coupled to contact 21 of switch 22 and to gates 23 and 24. The output of variable delay 18 is coupled to blocking oscillator 26 which is connected to delay line 27, video gate 28, and output terminal 29. Output terminal 31 of delay line 27 is connected to early gate 32, late gate 33, contact 34 of switch 22, and output terminal 36. Output terminal 37 of delay line 27 is connected to late gate 33 and video gate 28. The output of video gate 28 is connected to gate 39, the output of which is connected to bistable multivibrator 17. The output of early gate 32 is connected to gate 23, and the output of late gate 33 is connected to gate 24. The output of gates 23 and 24 are connected to terminals 41 and 42 of switch 22. Switch arms 43 and 44 of switch 22 are connected to motor 46 and switch arm 47 is connected to gate 39. Motor 46 is connected through gear 48 mechanically to variable delay 18. Also connected mechanically to gear 48 is hand crank 49.

The circuit consists of a series of decade counters indicated at 51, 52, and 53 connected in serial relationship to the output of gate 12. Each counter is in turn connected to a corresponding read gate. Counter 51 is connected to read gate 54, counter 52 is connected to read gate 55, and counter 53 is connected to read gate 56. Each read gate is in turn connected to a separate register which changes the digital count to a binary count. Read gate 54 is connected to register 57, read gate 55 is connected to register 58, and read gate 56 is connected to register 59. The output of delay line 27 at terminal 37 is connected to blocking oscillator 61, which in turn is connected to read gate 54, 55, and 56. Blocking oscillator 61 is also connected through one microsecond delay 62 to blocking oscillator 63, which in turn is connected to terminal 64. The outputs of registers 57, 58, and 59 are connected to output terminals 66, 67, and 68, respectively.

Operation

The operation of the block diagram of the preferred embodiment shown in FIG. 1 will now be described in conjunction with the waveforms shown in FIG. 2.

Free running oscillator 11 is a crystal controlled oscillator with a period equal to the shortest increment of range to be measured as dictated by the accuracy of the associated radar equipment. In the preferred embodiment this has a crystal frequency of 8.08564 mc. which corresponds to 0.01 nautical miles of radar range. The output of crystal oscillator 11 is shown as waveform 101 in FIG. 2. This is applied to gate 12 which is an And gate, i.e., requiring simultaneous inputs for an output. The oscillator waveform is only passed through gate 12 when there is an input from bistable multivibrator 17. Hence, the counter circuitry will only count the number of cycles passed by gate 12. It is pointed out that the counters are conventional and well known in the digital art and any commercial type of counters available may be used. It is thus deemed unnecessary to describe the counter system in detail.

Figure 2:
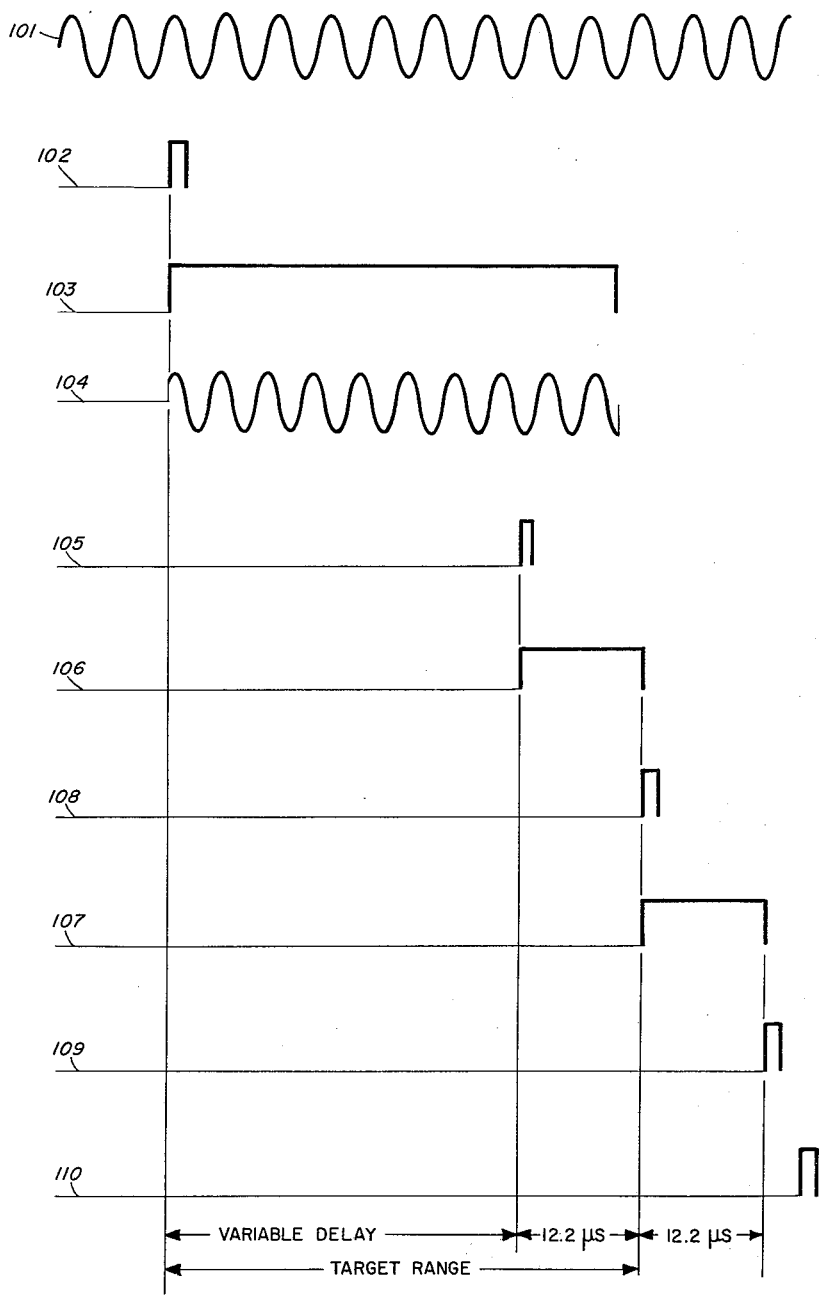
FIG. 2 illustrates the various waveforms present throughout the block diagram of FIG. 1.

The transmitter pulse from the radar, indicated at 102 in FIG. 2, is coupled to input terminal 14 which triggers blocking oscillator 16. Blocking oscillator 16 in the preferred embodiment has a variable recovery time, i.e., the recovery time can be set to a period greater than that of the radar equipment if so desired. The output from blocking oscillator 16 triggers bistable multivibrator 17 which opens gate 12, allowing the output of free running oscillator 11 to start the counters 51–53 counting the number of cycles at the same time as the transmitter pulse appears at terminal 14. The output of bistable multivibrator 17 is shown at waveforms 103 and the output from gate 12 to the counter 51 is shown as waveform 104 in FIG. 2. The output of blocking oscillator 16 is also applied to variable delay circuit 18. This circuit can be one of the well-known types of variable delay such as a Phantistron triggering a Schmitt, etc. The amount of delay is set by the setting of hand crank 49 and motor 46 which, of course, varies a control voltage in the delay circuit. The output from variable delay 18 triggers blocking oscillator 26 which is coupled to terminal 29 to be utilized as a synchronizing signal to start the precision range sweep of the associated radar equipment. This output is also coupled to start the video gate bistable multivibrator 28, and to the input of delay line 27. Delay line 27 has a fixed delay of 24.4 microseconds or 2 nautical miles. Output terminal 37 thus sees a pulse 24.4 microseconds after it enters delay line 27. Halfway through the delay line a tap is taken at terminal 31 which will represent 12.2 microseconds of time delay from the input of delay line 27. The output of blocking oscillator 26 starts early gate multivibrator 32. The output at terminal 31 of delay line 27 12.2 microseconds later starts late gate multivibrator 33 and stops early gate multivibrator 32, the full delay output at terminal 37 of delay line 27 stops the late gate multivibrator 33, and the video gate multivibrator 28. Video gate multivibrator 28 is then applied to And gate 39 which allows any video signal appearing in coincidence with this output to be passed by gate 39, and applied to stop bistable multivibrator 17. Thus at the instant the video signal appears with switch 22A as shown on the automatic position, gate 12 is opened between the transmitter pulse and the video signal of interest, and counter 13 will count the cycles of the free running oscillator 11 that occur during this period, digitizing the range of the video signal. Early gate 32 and late gate 33 are applied to And gates 23 and 24 along with the video signal appearing at input terminal 19. If the trailing edge of early gate 32 shown as waveform 106 of FIG. 2 and the leading edge of late gate shown at 107 of FIG. 2 bisect the video pulse, the outputs from gate 23 and 24 will be equal and motor 46 will receive no voltage drive, indicating the correct setting of variable delay 18. However, if the video signal appears more coincident with, for example, the early gate than the late gate, and gate 23 will supply more of an output than And gate 24, and the motor will be driven until the delay time of variable delay 18 adjusts the early and late gate multivibrators 32 and 33 to the point that the video signal is again bisected. This maintains the video signal precisely within the two mile delay time as set by delay line 27 which again determines the gating of And gate 39 as it is gated by bistable multivibrator 28.

The output of delay line 27 taken at terminal 37, which is the full 2 mile or 24.4 microsecond delay, is also applied to blocking oscillator 61, which triggers read gates 54, 55, and 56. These read gates are triggered at this time, approximately one mile after the count is completed, to allow the counters to reach their full count. The outputs of the read gates are fed through registers 57, 58, and 59 to binary range output terminals 66, 67, and 68 which may be used with associated equipment. Another output from blocking oscillator 61 is delayed one microsecond further through delay circuit 62 and triggers blocking oscillator 63. The output of blocking oscillator 63 taken at terminal 64 is utilized as a counter reset pulse, resetting the counters to zero for a new count. The one microsecond delay is to assure the registering of the count before reset.

Should the video signal be too weak to turn off bistable multivibrator 17, switch 22, shown as sections 22A as applied to gate 39 and 22B as applied to motor 46, is thrown to the manual position. This removes the video signal from the input of bistable multivibrator 17 and removes the output to the servo drive unit from motor 46. In this operation, manual crank 49 is adjusted to make the range mark appearing at terminal 36 coincide with the weak video signal of interest on a radar display unit. The range mark is then used in place of the video signal to stop bistable multivibrator 17 and close gate 12 thus giving the same count in the manual position as in the automatic position.

The described invention may also be used to measure the range of multiple targets for tracking during the scan operation by gating a separate set of read gates and register for each target to be measured and stopping the counter and clearing after the maximum range target has been determined.

Obviously many modifications and variations of the present invention are possible in the light of the above teachings. It is therefore to be understood that within the scope of the appended claims the invention may be practiced otherwise than as specifically described.

What is claimed is:

1. A digital range unit comprising a precision oscillator having an output connected through a gating means to counting means, a first gate generator connected to said gating means, said first gate generator having start and stop inputs and yielding an output gate to said gating means having a start time coinciding with the time a signal is applied to said start input and a stop time coinciding with the time a signal is applied to said stop input, whereby said gating means passes said oscillator output between said start time and said stop time, an And gate, the output of said And gate connected to said stop input, said And gate having first and second inputs, said first And gate input being connected to a signal to be timed, a delayed gate generator, said second And gate input being connected to the output of said delayed gate generator, whereby only signals in coincidence with said delayed gate will operate to stop said gating means, a variable time delay means, said start input signal also being connected through said variable time delay means to a fixed time delay means, said fixed delay means having a first output having a time delay $t$ and a second output having a time delay $2t$, said first fixed time delay output connected to start said delayed gate generator, and said second fixed time delay output connected to stop said delayed gate generator.

2. The digital range unit of claim 1 including servo means having inputs connected to said fixed and variable time delay means outputs and said signal to be timed, said servo means having an output responsive to the time relationships of said servo means inputs, said servo means output connected to a time delay controlling means, whereby a correction signal will be applied to said variable time delay means to delay said first fixed time delay output a time equal to the time difference between said start and stop inputs signals to said gating means.

3. The digital range unit of claim 2 including pulse actuated counter read-out means and counter reset means connected to said counters, said counter read-out means and counter reset means connected for actuation to the second output of said fixed time delay means, and a short time delay means interposed between said second output of said fixed time delay means and said counter reset means.

References Cited in the file of this patent
UNITED STATES PATENTS

| | | |
|---|---|---|
| 2,832,044 | Bliss | Apr. 22, 1958 |
| 2,844,790 | Thompson et al. | July 22, 1958 |
| 2,851,596 | Hilton | Sept. 9, 1958 |
| 2,887,653 | Meyers | May 19, 1959 |